US012810002B2

(12) United States Patent
Thekkumpurath et al.

(10) Patent No.: US 12,810,002 B2
(45) Date of Patent: Nov. 24, 2026

(54) SYSTEMS AND METHODS FOR SOFTWARE APPLICATION ACCESS MANAGEMENT

(71) Applicant: BANK OF AMERICA CORPORATION, Charlotte, NC (US)

(72) Inventors: Asha Thekkumpurath, Frisco, TX (US); Mohammad Saleem Gaziani, Plano, TX (US); Aravind Singtalur, McKinney, TX (US); John Andres Lozes, Wilmington, DE (US); Tonya Kyra Miller, Charlotte, NC (US); Amer Ali, Jersey City, NJ (US); Aaron Gee, Palm Coast, FL (US); Andrea M. Weisberger, Jacksonville, FL (US); Aisha Jenkins, Atlanta, GA (US); Naresh Kumar Petapalle, Greater London (GB); Manonmani Palanichamy, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 34 days.

(21) Appl. No.: 18/904,334

(22) Filed: Oct. 2, 2024

(65) Prior Publication Data

US 2026/0093829 A1 Apr. 2, 2026

(51) Int. Cl.
*G06F 21/00* (2013.01)
*G06F 21/62* (2013.01)

(52) U.S. Cl.
CPC .................................... *G06F 21/62* (2013.01)

(58) Field of Classification Search
CPC ..... G06F 21/62; G06F 21/6245; H04L 63/10; H04L 63/107; H04W 12/63; H04W 12/64
See application file for complete search history.

(56) References Cited

U.S. PATENT DOCUMENTS 8,566,459 B2 10/2013 Dehaan
9,131,008 B2 9/2015 Brown
(Continued)

FOREIGN PATENT DOCUMENTS

AU 2008265754 A1 12/2008
AU 2008289199 B2 2/2014
(Continued)

*Primary Examiner* — Amir Mehrmanesh
*Assistant Examiner* — Chi D Nguy
(74) *Attorney, Agent, or Firm* — Moore & Van Allen PLLC; William Walters

(57) ABSTRACT

Systems, computer program products, and methods are described herein for software application access management. The present disclosure is configured to receive a trigger; determine a user main account login, wherein the user main account login comprises a user is logged into a main account on a user device; access a peripheral device, wherein the peripheral device is used to determine a physical location of the user, and wherein the peripheral device is communicatively coupled to the user device; determine a user presence, wherein the user presence comprises determining the user is physically near the user device by using data from the peripheral device; retrieve an address from a database, wherein the address is associated with an application, and wherein the address is retrieved via querying the database; and execute a macro, wherein the macro is used to access the application via the address using a network protocol.

17 Claims, 7 Drawing Sheets

(56) References Cited

U.S. PATENT DOCUMENTS

| | | | | |
|---|---|---|---|---|
| 10,389,597 | B2 | 8/2019 | Laos | |
| 10,795,581 | B2 | 10/2020 | Gupta | |
| 11,006,544 | B1 | 5/2021 | McGraw | |
| 11,233,794 | B2 | 1/2022 | Shankar | |
| 11,669,645 | B2 | 6/2023 | Vijayvargiya | |
| 12,106,132 | B2 | 10/2024 | Liguori | |
| 2004/0015957 | A1 | 1/2004 | Zara | |
| 2006/0075110 | A1* | 4/2006 | Seraphin | H04L 63/08 709/227 |
| 2007/0261045 | A1 | 11/2007 | Gujarathi | |
| 2008/0091701 | A1 | 4/2008 | Gujarathi | |
| 2008/0141350 | A1 | 6/2008 | Merkin | |
| 2009/0019082 | A1 | 1/2009 | Reeves | |
| 2018/0026964 | A1* | 1/2018 | Child | H04L 63/0884 726/8 |
| 2021/0058301 | A1 | 2/2021 | Liguori | |
| 2021/0234716 | A1 | 7/2021 | McGraw | |
| 2023/0036002 | A1 | 2/2023 | Pennell | |
| 2024/0241564 | A1* | 7/2024 | Alfano | G06F 1/3231 |

FOREIGN PATENT DOCUMENTS

| | | | |
|---|---|---|---|
| KR | 102441860 | B1 | 9/2022 |
| RU | 2475976 | C2 | 2/2013 |

* cited by examiner

SYSTEMS AND METHODS FOR SOFTWARE APPLICATION ACCESS MANAGEMENT

TECHNOLOGICAL FIELD

Example embodiments of the present disclosure relate to systems and methods for software application access management.

BACKGROUND

There are significant issues related to access management. Applicant has identified a number of deficiencies and problems associated with conventional procedures for software access management. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for software application access management.

Embodiments of the present invention address the above needs and/or achieve other advantages by providing apparatuses (e.g., a system, computer program product, and/or other devices) and methods for software application access management. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the disclosure as described herein provides for receiving a trigger. In some embodiments, the disclosure as described herein further includes determining a user main account login, wherein the user main account login includes a user is logged into a main account on a user device. Further, in some embodiments, the disclosure provides for accessing a peripheral device, wherein the peripheral device is used to determine a physical location of the user, and wherein the peripheral device is communicatively coupled to the user device. Further, in some embodiments, the disclosure provides for determining a user presence, wherein the user presence includes determining the user is physically near the user device by using data from the peripheral device. In some embodiments, the disclosure provides for retrieving an address from a database, wherein the address is associated with an application, and wherein the address is retrieved via querying the database. In some embodiments, the disclosure provides for executing a macro, wherein the macro is used to access the application via the address using a network protocol.

In some embodiments, the trigger may include at least one of a periodic trigger, an action trigger, a network trigger, or a user trigger.

In some embodiments, the action trigger may further include receiving an access window, wherein the access window defines a first time period within which the user is required to login to the application to maintain access to the application. Further, in some embodiments, the action trigger may include creating a login window, wherein the login window defines a second time period equal to or less than the access window. Further, in some embodiments, the action trigger may include determining that a last login is within the login window, wherein the last login includes a most recent user login of the application.

In some embodiments, executing the macro may include retrieving the address from the database. In some embodiments, executing the macro may include initiating a browser, wherein the browser includes executable software stored on the user device. In some embodiments, executing the macro may include establishing a connection to the application via the address using the browser and the network protocol. In some embodiments, executing the macro may include configuring the user device to display the application.

In some embodiments, the database may further include user credentials, wherein the user credentials are used to access the application, and wherein executing the macro may further include retrieving the address from the database. Further, in some embodiments, executing the macro may include initiating a browser, wherein the browser includes executable software stored on the user device. In some embodiments, executing the macro may further include establishing a connection to the application via the address using the browser and the network protocol. In some embodiments, executing the macro may further include locating one or more fields associated with a form of the application used to input the user credentials. In some embodiments, executing the macro may include inputting the user credentials into the one or more fields associated with the form. In some embodiments, executing the macro may include submitting the form, wherein submitting the form authenticates the user credentials and logs the user into the application.

In some embodiments, determining the user presence may include receiving a user input via the peripheral device, wherein the user input indicates the user is physically near the user device.

In some embodiments, the user input may include a prompt, wherein the prompt includes configuring the user device to display the prompt and includes an attestation from the user indicating the user is physically near the user device.

In some embodiments, the address further includes a uniform resource locator (URL) address, wherein the application is a web-based application.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
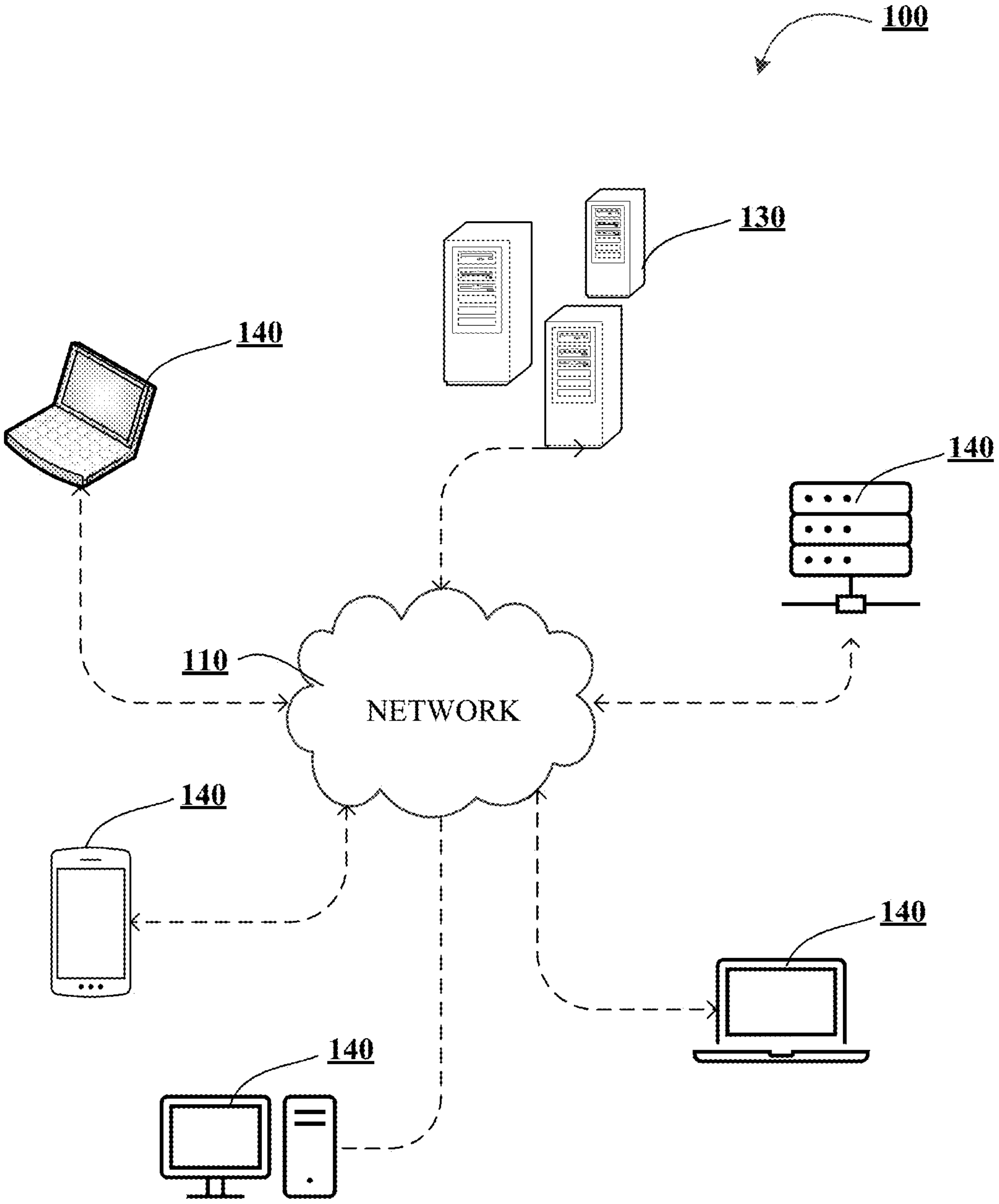
Figure 1B:
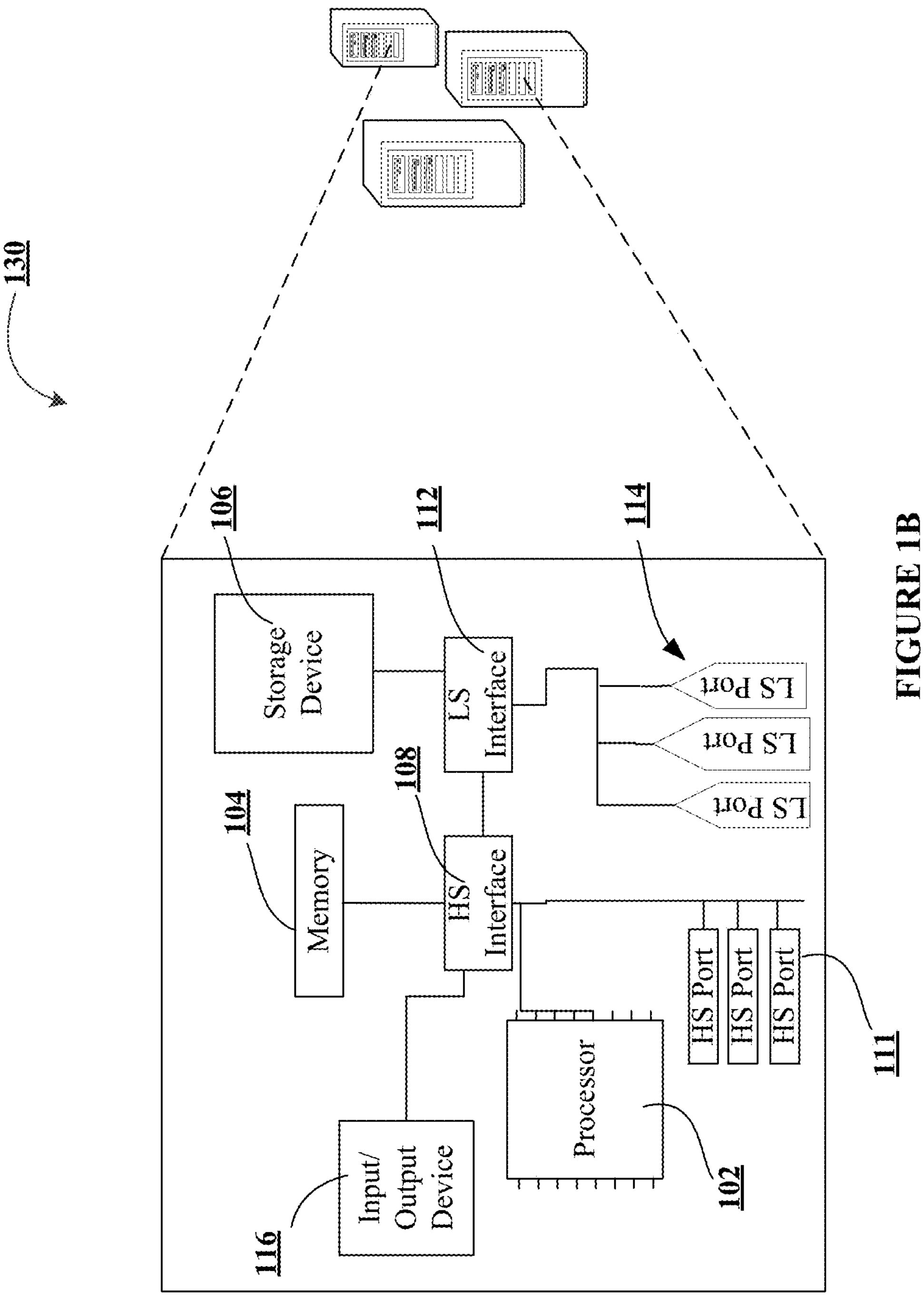
Figure 1C:
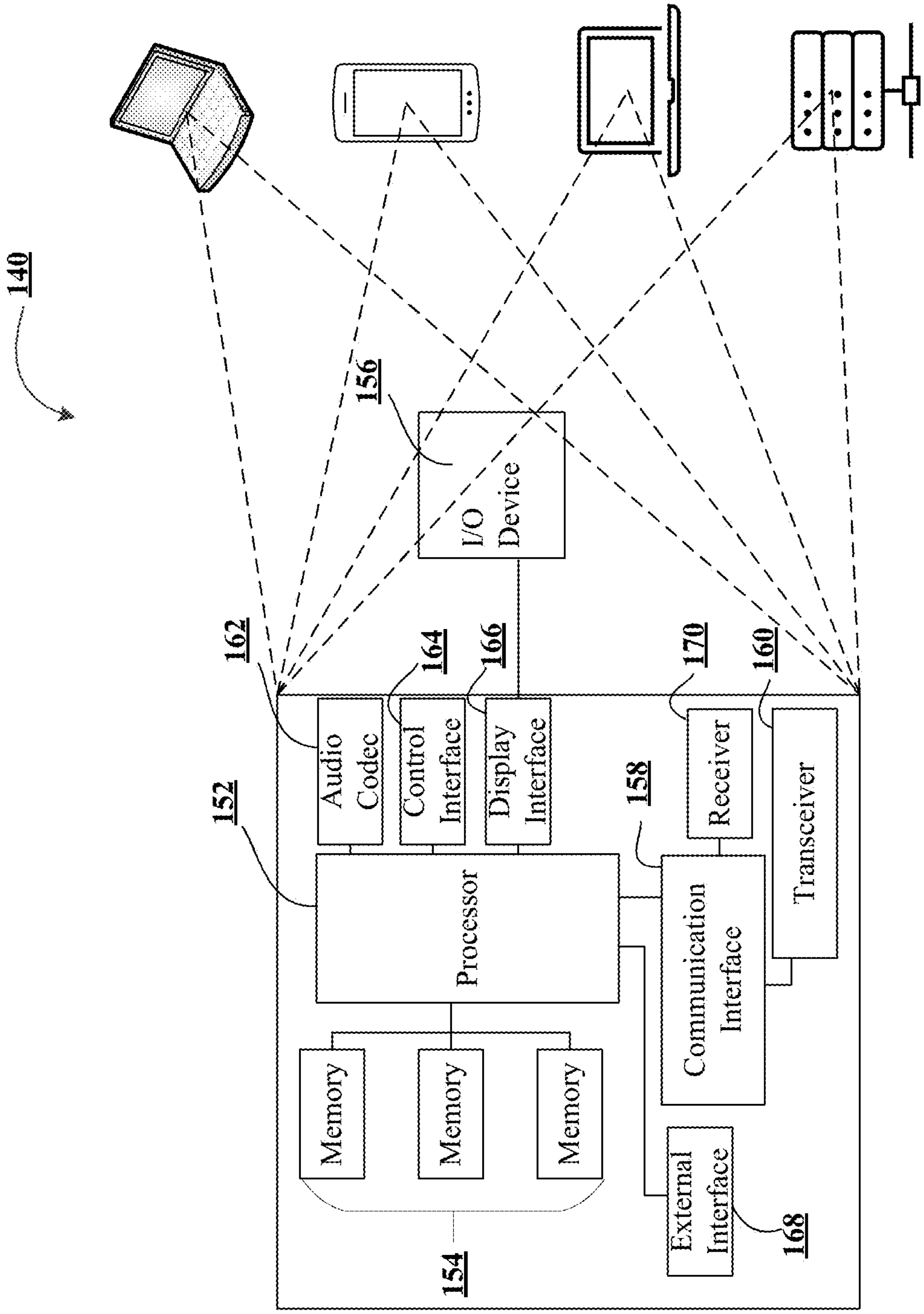
Figure 2:
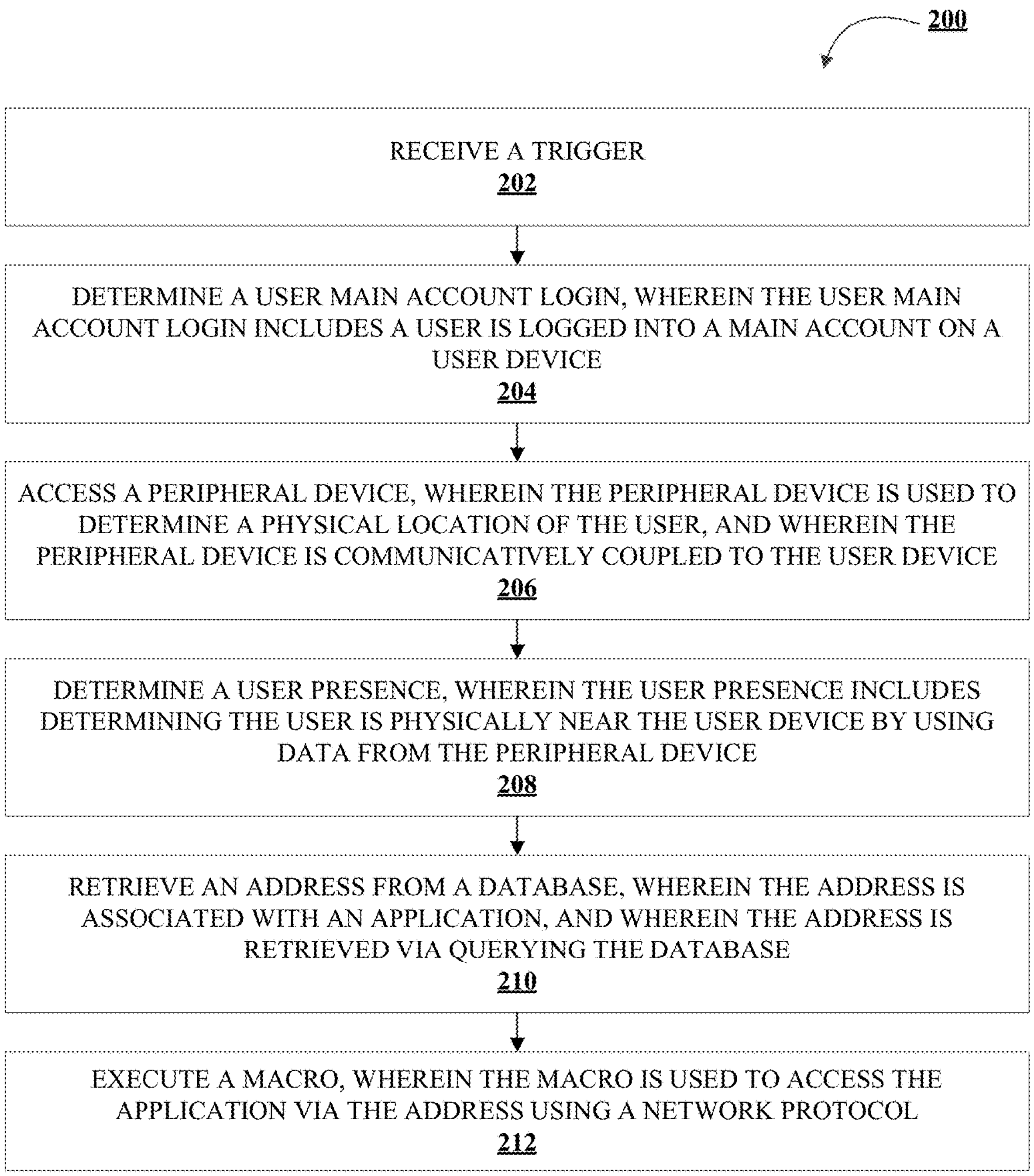
Figure 3:
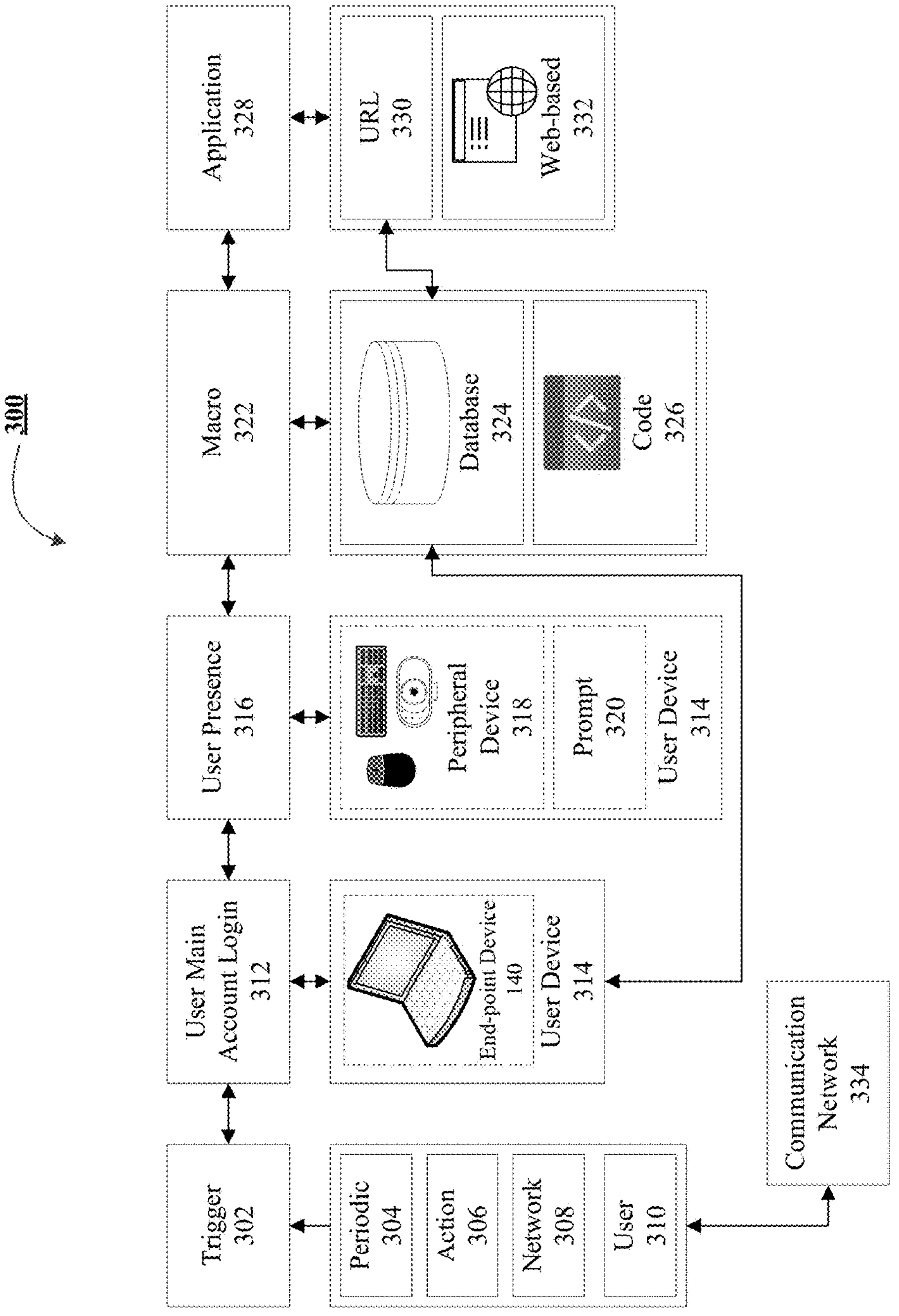
Figure 4:
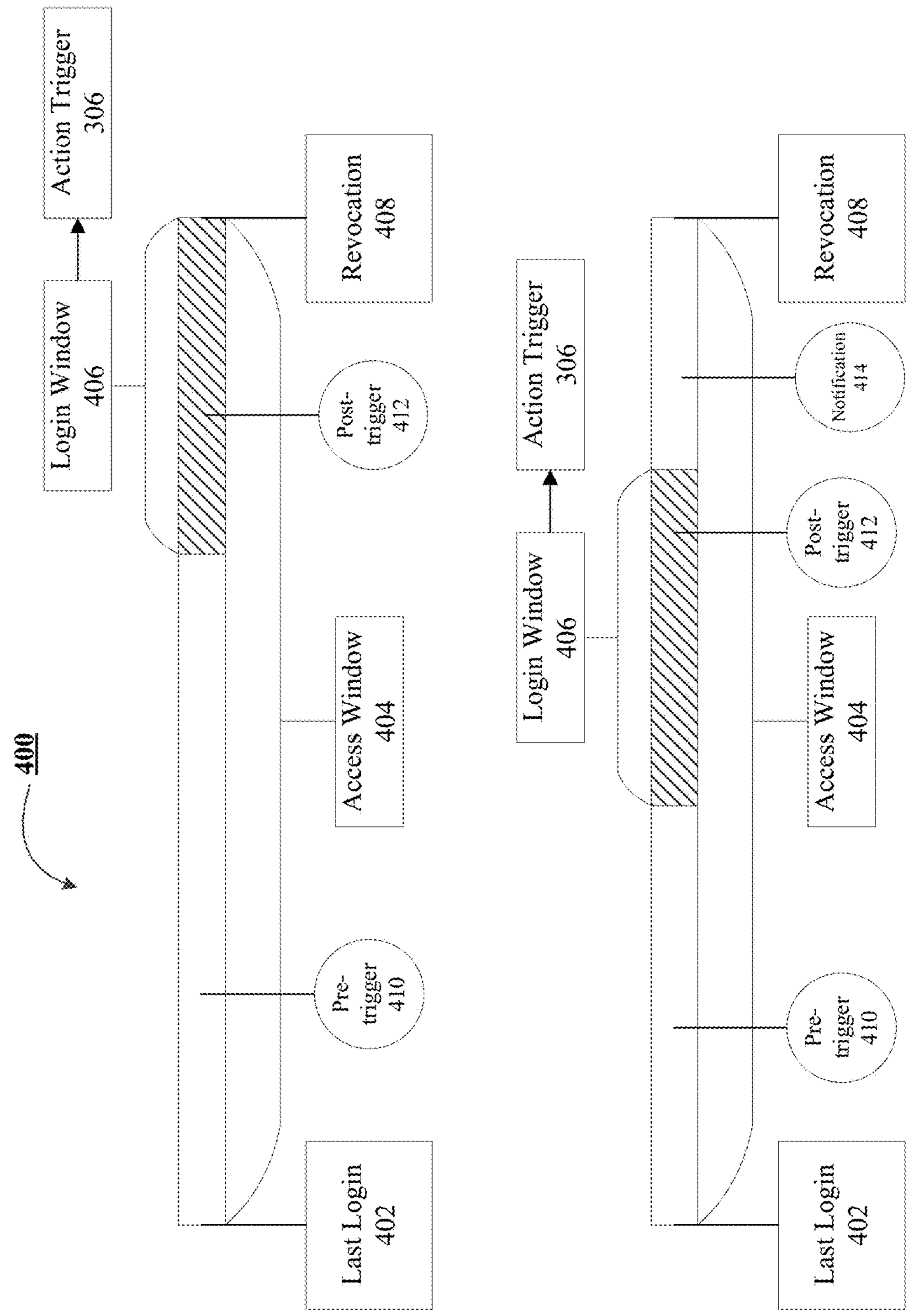
Figure 5:
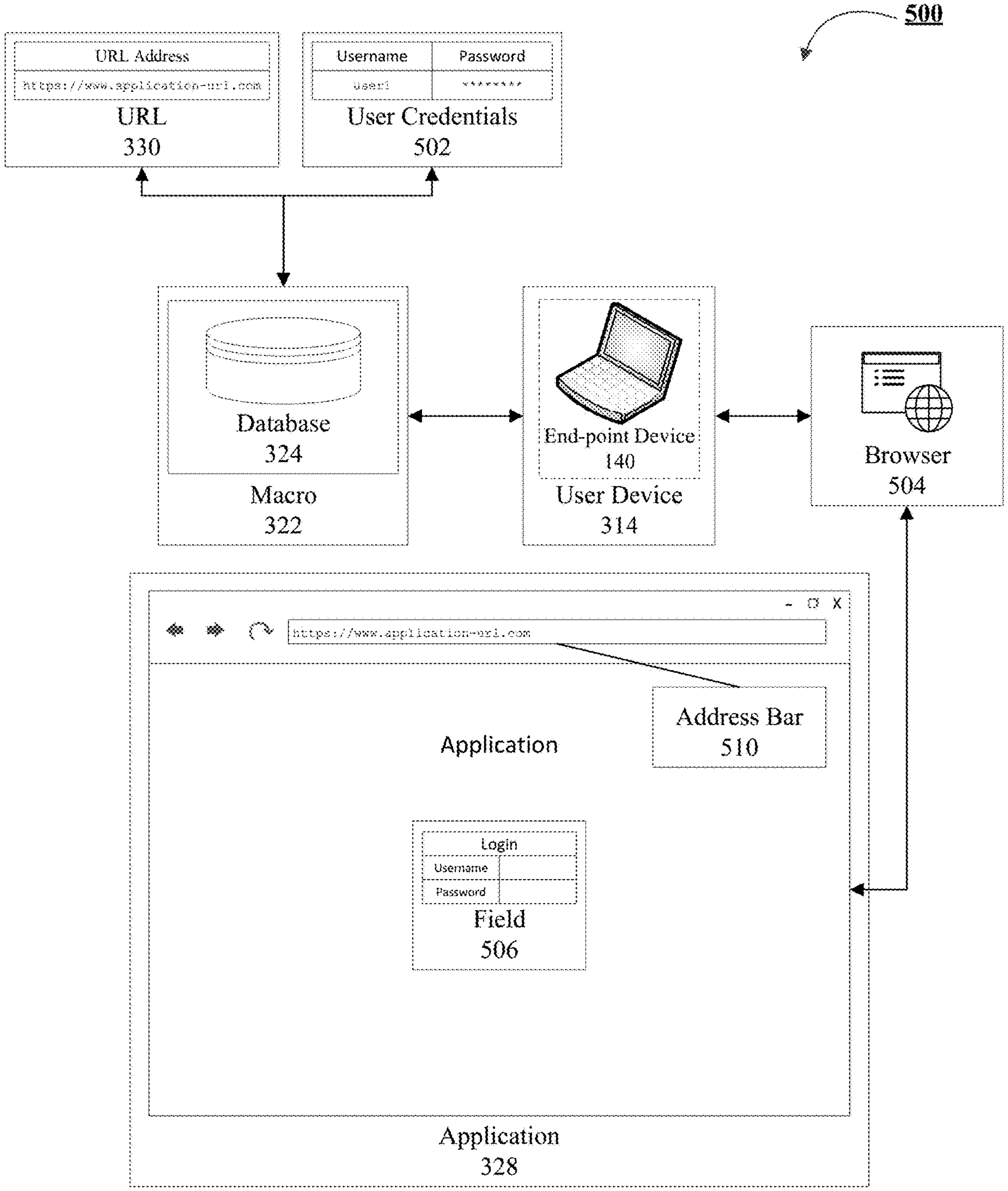

FIGS. 1A-1C illustrates technical components of an exemplary distributed computing environment for software application access management, in accordance with an embodiment of the disclosure;

FIG. 2 illustrates a process flow for software application access management, in accordance with an embodiment of the disclosure;

FIG. 3 illustrates an example embodiment for software application access management, in accordance with an embodiment of the disclosure;

FIG. 4 illustrates an action trigger based on a login window, in accordance with an embodiment of the disclosure; and FIG. 5 illustrates an example embodiment of accessing an application, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In the modern world, access management includes the ability of a user to retain access to an application. The applications the user needs to retain access to may include applications that are critical to operations the user performs as an employee, a contractor, a third party, a vendor, or the like. In this regard, the user may need access to the application in unscheduled downtimes of a system or network environment. For example, a user may use an application to manage operations of a computing network. In this example, the user may need to have access to the application to configure the computing network when unscheduled downtime occurs on the computing network. Users who do not have access to the application during these times may not be able to recover the computing network's operations in a timely manner, causing outsized effects downstream. Further, the negative consequences of such instances may be mitigated through the user maintaining access to the application. Problems arise, however, when users are expected to maintain access to a vast number of applications. Further, the number of applications used is expected to grow, increasing the number of applications a user needs to maintain access to.

The applications users are required to maintain access to may include applications that have a dormancy policy. These dormancy policies include access windows in which the users are required to login to maintain access to the application. Typically, a dormancy policy may include a 90-day window for the user to login to retain access. If the user does not login during the access window, the user may be required to follow Access Retention Management (ARM) procedures. These ARM procedures may involve waiting periods of 24 to 48 hours while the user is reinstated. During that time, if an unscheduled downtime occurs and the user is unable to access the application to fix the unscheduled downtime, networking environments may suffer serious consequences. Therefore, systems and methods for software application access management are introduced for users to maintain access to these critical applications.

The system as described herein may include a macro that, when executed, causes the application to be displayed on the user device. The macro may be triggered in a variety of ways. For instance, a periodic trigger based on a specified timeframe may cause the application to be displayed. The periodic trigger may be scheduled by a task scheduler program. In this way, for example, when the period occurs (e.g., once a week, twice a month, once a month, etc.), the scheduler program may generate a trigger to the macro. There are a variety of other triggers that may cause the macro to be executed, as well. For example, the trigger may also include an action trigger, a network trigger, or a user trigger. Once the trigger is received, the address to the application may be retrieved. The address may be a URL address used to navigate to the application's web page. Further, prior to executing the macro that pulls the website, security features may determine the user is logged into the user's main account and that the user is present at the user device. The user's main account may be a user device account login (e.g., main computer account). Further, the system may determine the user is present at the user device via a peripheral device (e.g., a webcam, a keyboard, a mouse, etc.). In this way, the user may need to be logged into the user device and present at the user device prior to the application's login page being pulled up.

What is more, the present disclosure provides a technical solution to a technical problem. As described herein, the technical problem includes conventional systems access management procedures, which may include revoking a user's access after the access window period. The technical solution presented herein allows for the user to retain access via software application access management by trigger a macro to access the application. In particular, the access management system is an improvement over existing solutions to the conventional access retention procedures, (i) with fewer steps to achieve the solution, thus reducing the amount of computing resources, such as processing resources, storage resources, network resources, and/or the like, that are being used (e.g., by automating retrieval and access of the application), (ii) providing a more accurate solution to problem, thus reducing the number of resources required to remedy any errors made due to a less accurate solution (e.g., by executing the macro during a time when the user's access may be revoked), (iii) removing manual input and waste from the implementation of the solution, thus improving speed and efficiency of the process and conserving computing resources (e.g., by eliminating the need for the user to manually and individually access the applications), (iv) determining an optimal amount of resources that need to be used to implement the solution, thus reducing network traffic and load on existing computing resources (e.g., by determining which applications need to be logged into in order for the user to retain access). Furthermore, the technical solution described herein uses a rigorous, computerized process to perform specific tasks and/or activities that were not previously performed. In specific implementations, the technical solution bypasses a series of steps previously implemented, thus further conserving computing resources.

In addition, the technical solution described herein is an improvement to computer technology and is directed to non-abstract improvements to the functionality of a computer platform itself. Specifically, the access management system as described herein is a solution to the problem of conventional access management procedures that revoke a user's access to an application based on a use-it-or-lose-it (UIOLI) policy. Further, the access management system may be characterized as identifying a specific improvement in computer capabilities and/or network functionalities in response to the access management system's integration to existing devices, software, applications, and/or the like. In this way, the access management system improves the capability of a system to retain a user's access to an application the user needs to perform the user's job duties, operations, or the like. Further, the access management system improves the functionality of networks in response to reducing the resources consumed by the system (e.g., network resources, computing resources, memory resources, and/or the like).

FIGS. 1A-1C illustrate technical components of an exemplary distributed computing environment 100 for software application access management, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for software application access management, in accordance with an embodiment of the disclosure. The method may be carried out by various components of the distributed computing environment 100 discussed herein (e.g., the system 130, one or more endpoint device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an access management system (e.g., similar to one or more of the systems described herein with respect to FIGS. 1A-1C) may perform one or more of the steps of process flow 200. For example, an access management system (e.g., the system 130 described herein with respect to FIGS. 1A-1C) may perform the steps of process flow 200.

As shown in block 202, the process flow 200 of this embodiment includes receiving a trigger. In some embodiments, the trigger may further include at least one of a periodic trigger, an action trigger, a network trigger, or a user trigger. As shown in FIG. 3, the trigger 302 may include a periodic trigger 304, an action trigger 306, a network trigger 308, or a user trigger 310. In some embodiments, the periodic trigger 304 may include a time-based trigger, wherein the period is set by the user. In this regard, a secondary program, such as a scheduler application, may keep track of the period and transmit the trigger 302 to the system 130 accordingly. The secondary program may be stored on the user device and may communicate with the system 130. For example, a user may set a period in a secondary program for the secondary program to generate a trigger once every month. In this example, once a month the secondary program may generate and transmit the trigger to the system 130.

Further, in some embodiments, the network trigger 308 may include generating and transmitting a trigger 302 based on events or requests on the network (e.g., the communication network 334), an infrastructure technology (IT) based trigger, or the like. In this regard, the communication network 334 may generate and/or transmit the trigger 302 to the system 130. For example, an employee associated with the IT department of an entity may cause a trigger (e.g., the trigger 302) to be transmitted to the system 130.

Further, in some embodiments, the user trigger 310 may include a user-generated trigger that is transmitted to the system 130. In this way, the user may generate and or transmit the trigger 302 to the system unilaterally and at any point the user wishes to transmit the trigger 302. For example, the user may manually, and at any point in time, transmit the trigger 302 to the system 130. Further, the types of triggers may be inclusive of other triggers. In other words, a trigger 302 may be generated on a periodic trigger 304 on a first day, and on a second day the trigger 302 trigger may be based on a user trigger 310.

In some embodiments, the action trigger 306 may include receiving an access window, wherein the access window defines a first time period within which the user is required to login to the application to maintain access to the application. In some embodiments, the action trigger may include creating a login window, wherein the login window defines a second time period equal to or less than the access window. In some embodiments, the action trigger may include determining that a last login is within the login window, wherein the last login includes a most recent user login of the application.

As shown in FIG. 4, the last login 402 may indicate the last time the user logged into the application. The access window 404 may indicate a first time period the user has to log back into the application in order to maintain access. The revocation 408 may indicate the last point in time the user has to log into the application to maintain access. Further, after the revocation 408, the user may lose access to the application. The login window 406 may be a second time period that is equal to or less than the access window 404 that generates the action trigger 306.

Further, the pre-trigger 410 time period may indicate the time period before the login window 406 where no trigger is generated or transmitted to the system 130. After the long window 406 time period (e.g., the post-trigger 412 time period) has been entered, the action trigger 306 may be generated and transmitted to the system 130. In some embodiments, if the action trigger 306 fails to generate and/or transmit to the system 130, the system 130 may generate a notification 414. The notification 414 may be transmitted to the system 130, the user device 314, or the like. Further, the notification 414 may indicate that the system 130 needs to be triggered in a different way (e.g., the periodic trigger 304, the network trigger 308, or the user trigger 310).

As shown in block 204, the process flow 200 of this embodiment includes determining a user main account login, wherein the user main account login includes a user is logged into a main account on a user device. In some embodiments, the user main account may be main account login to the user device 314. In this way, the main account may be the general account used to login to the user device 314. As shown in FIG. 3, the user main account login 312 may be determined via the user device 314 to ensure the user is logged into the user's main account on the user device 314. In some embodiments, the system 130 may require the user be logged into the user main account 312 prior to accessing the system 130. For example, the system 130 may only be accessible on the user device 314 after the user has logged into the user main account 312.

The user presence may indicate that the user is physically present and/or near the user device 314. In some embodiments, and for security reasons, the system 130 may only be accessible while the user is near the user device 314. As shown in block 206, the process flow 200 of this embodiment includes accessing a peripheral device, wherein the peripheral device is used to determine a physical location of the user, and wherein the peripheral device is communicatively coupled to the user device. Further, as shown in block 208, the process flow 200 of this embodiment includes determining a user presence, wherein the user presence includes determining the user is physically near the user device by using data from the peripheral device.

In some embodiments, determining the user presence may include receiving a user input via the peripheral device, wherein the user input indicates the user is physically near the user device. In some embodiments, and as shown in FIG. 3, the peripheral device 318 may include a variety of devices used to detect physical location of the user. In some embodiments, the peripheral device 318 may be physically connected to the user device 314, such as a mouse, a keyboard, a camera, a sensor, or the like. In this regard, the peripheral device 318 may be able to detect if the user is close enough to the user device 314 to for the system 130 to operate. For example, a camera (e.g., the peripheral device 318) may detect the user presence via detecting, through the camera, that the user is in front of the camera. Further, the camera may also communicate to the user device 314 that the camera is plugged in to the user device 314 and confirms the user presence.

In some embodiments, the peripheral device 318 may include a device that determines the user's geolocation. In this way, the peripheral device 318 may use a geolocation positioning system (GPS) that determines the user's coordinates (e.g., longitude and latitude). The peripheral device's 318 location information may be compared to the user device's 314 location information to determine the user's location.

In some embodiments, the user input includes a prompt, wherein the prompt includes configuring the user device to display the prompt and includes an attestation from the user indicating the user is physically near the user device. In some embodiments, the prompt 320 may be displayed on the user device 314 in conjunction with or independently from input received from the peripheral device 318. In this regard, the prompt 320 may be used to determine user presence or may be used as a secondary check to confirm user presence near the user device 314. For example, the system 130 may configure the user device 314 to display the prompt 320 for the user to attest that the user is physically near the user device 314.

As shown in block 210, the process flow 200 of this embodiment includes retrieving an address from a database, wherein the address is associated with an application, and wherein the address is retrieved via querying the database.

In some embodiments, the address further includes a uniform resource locator (URL) address, wherein the application is a web-based application. For example, as shown in FIGS. 3 and 5, the address may include a URL 330 and may be stored on the database 324. The URL 330 may be an address that is used in the browser 504 to access the application, wherein the application is web-based 332.

In some embodiments, the database 324 may be accessible by the user device 314. The database 324 may be a local database, a cloud-based database, or otherwise accessible over the communication network 324 by the user device 314. Further, the database 324 may include the memory of the end-point device 140, as described in FIGS. 1A-1C. In some embodiments, the user device 314 may be a thin client device with access to a server, which may include the database 324.

As shown in block 212, the process flow 200 of this embodiment includes executing a macro, wherein the macro is used to access the application via the address using a network protocol. In some embodiments, executing the macro may include retrieving the address from the database. In some embodiments, executing the macro may include initiating a browser, wherein the browser includes executable software stored on the user device. In some embodiments, executing the macro may include establishing a connection to the application via the address using the browser and the network protocol. In some embodiments, executing the macro may include configuring the user device to display the application.

The macro 322 may be a program, software, or the like that executes portions of code to configure other programs, software, applications, and the like it is communicatively coupled to. The macro 322 may be a standalone program or may be a part of another program or software. In this regard, and in some embodiments, the macro 322 may be able to be executed without the need for opening, initiating, or otherwise running other applications.

Further, in other embodiments, the macro 322 may be a part of another program, which may require the program to be initialized prior to executing the macro 322. In some embodiments, the trigger 302 may open the program associated with the macro 322 if needed. For example, if the macro 322 is associated with another program (e.g., needs the other program to be open prior to the macro 322 running), the trigger 302 may first open the program and then may perform the steps as described herein.

In some embodiments, the database may further include user credentials, wherein the user credentials are used to access the application. Further, in some embodiments, executing the macro may further include locating one or more fields associated with a form of the application used to input the user credentials. In some embodiments, executing the macro may include inputting the user credentials into the one or more fields associated with the form. In some embodiments, executing the macro may include submitting the form, wherein submitting the form authenticates the user credentials and logs the user into the application.

For example, as shown in FIG. 5, the macro 322 may access the database 324 to retrieve the address (e.g., URL 330) and, in some embodiments, the user credentials 502. The user credentials 502 may include authentication credentials, as explained in greater detail above. The user credentials 502 may include the user's authentication credentials used to login to the application 328. In some embodiments, the user may have stored the user credentials 502 in the database 324 prior to the macro 322 executing.

Further, the macro 322 may initiate the browser 504 on the user device 314. In some embodiments, the browser 504 may be a web-based browser used to connect and interact with the Internet. In this regard, the macro 322 may configure the user device 324 to initiate and navigate to the application's 328 web page via the URL 330. Further, the macro 322 may input the URL 330 into the address bar 510. In this regard, the address bar 510 may be used by the browser 504 to navigate to the application 328.

Further, the network protocol may include a set of rules and conventions that define how data is transmitted across the communication network 334. In this regard, the network protocol may be used by the macro 322 to determine how to access the application 328. For example, the network protocol may include using a hypertext transfer protocol (HTTP/HTTPS) to access the application 328. In this way, the URL 330 may follow the convention set out by the network protocol. Further, in some embodiments, the macro 322 may recognize the network protocol used by the application 328 and use the proper network protocol when retrieving the address associated with the application 328. In this regard, the macro 322 may configure the address stored in the database 324 to conform to the network protocol used by the application 328. For instance, if an address stored in the database 324 uses an incorrect protocol, the macro 322 may understand that the address should be configured in order to be able to access the application 328 based on the incorrect protocol.

In this regard, after the macro 322 has logged the user into the application 328, the macro 322 may confirm the log in was successful. The macro 322 may receive feedback from the application 328 indicating a successful login via receiving a confirmation message, a successful authentication of the user credentials 502, reading the address bar 510, or the like. For example, the application 328 may transmit a notification that the user login, via the macro 322, was successful, which may indicate to the macro 322 that the login was successful. Further, the macro 322 may read the updated address bar 510 after the macro 322 has submitted the user credentials 502 in the field 506. In this way, the macro 322 may understand that the URL 330 may be updated to indicate the browser 504 has loaded to an updated web page, which indicates the log in was successful.

In some embodiments, the macro 322 may analyze the application's 328 web page to determine where the field 506 is in order to input the user credentials 502. For instance, the macro 322 may scan the web page to determine how to enter the user credentials into the field 506. This may include analyzing the code of the web page, objects of the web page, or the like.

In some embodiments, the macro 322 may log out of the application 328. In this regard, the macro 322 may determine that the application 328 has been successfully logged into and afterwards, may log out of the application 328.

In some embodiments, the access management system (e.g., the system 130) may, when executing the instructions, further cause the processing device to prioritize the address. In some embodiments, prioritizing the address may include receiving the address, wherein receiving the address includes logging user logins to the application, wherein the user logins are received via the user device. Further, in some embodiments, the system may determine a priority of the application. In some embodiments, the priority of the application may include a frequency of user logins, an interaction time, and a usage report. In some embodiments, the frequency of user logins may include the number of user logins to the application over a given time period. In some embodiments, the interaction time may include how long the user interacts with the application in a given session. In some embodiments, the usage report may include determining how important the application's functionalities are. Further, in some embodiments, prioritizing the address may include configuring, based on the priority of the application, the trigger to execute the macro.

In some embodiments, the access management system (e.g., the system 130 as described herein) may be able to validate addresses associated with servers. The servers may be servers hosted by the entity that hosts the access management system or may be a third-party entity hosting the servers. The process of address validation may include the need to validate multiple URLs for a single server. Conventionally, this may include intensive manual operations, especially when numerous servers are needing to be validated. Further, the validation process may include regularly scheduled validations, which can be resource intensive in its own right. Therefore, the access management system may be able to handle the server address validation process, similar to as described above.

In some embodiments, the addresses (e.g., the URL 330) may be inputted to a database 324 either through manual or automated processes. The addresses may include paths that may be used to access applications associated with system 130 and/or server functionality. The manual process may include a user manually entering the addresses into the database 324 for the system 130 to use. The automated process may include the system 130 recording the prioritized (e.g., most-used, most-recent, and/or the like) addresses the servers interact with. In this way, the prioritized addresses may be configured in the database 324.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for software application access management, the system comprising:
- a processing device;
- a non-transitory storage device containing instructions when executed by the processing device, causes the processing device to perform the steps of:
  - receive a trigger;
  - determine a user main account login, wherein the user main account login comprises a user is logged into a main account on a user device;
  - access a peripheral device, wherein the peripheral device is used to determine a physical location of the user, and wherein the peripheral device is communicatively coupled to the user device;
  - determine a user presence, wherein the user presence comprises determining the user is physically near the user device by using data from the peripheral device;
  - retrieve an address from a database, wherein the address is associated with an application, and wherein the address is retrieved via querying the database; and
  - execute a macro, wherein the macro is used to access the application via the address using a network protocol, wherein executing the macro further comprises:
    - retrieving the address from the database;
    - initiating a browser, wherein the browser comprises executable software stored on the user device;
    - establishing a connection to the application via the address using the browser and the network protocol; and
    - configuring the user device to display the application.

2. The system of claim 1, wherein the trigger further comprises at least one of:
- a periodic trigger,
- an action trigger,
- a network trigger, or
- a user trigger.

3. The system of claim 2, wherein the action trigger further comprises:
- receiving an access window, wherein the access window defines a first time period within which the user is required to login to the application to maintain access to the application;
- creating a login window, wherein the login window defines a second time period equal to or less than the access window; and determining that a last login is within the login window, wherein the last login comprises a most recent user login of the application.

4. The system of claim 1, wherein the database further comprises user credentials, wherein the user credentials are used to access the application, and wherein executing the macro further comprises:

retrieving the address from the database;

initiating a browser, wherein the browser comprises executable software stored on the user device;

establishing a connection to the application via the address using the browser and the network protocol;

locating one or more fields associated with a form of the application used to input the user credentials;

inputting the user credentials into the one or more fields associated with the form; and submitting the form, wherein submitting the form authenticates the user credentials and logs the user into the application.

5. The system of claim 1, wherein determining the user presence further comprises receiving a user input via the peripheral device, wherein the user input indicates the user is physically near the user device.

6. The system of claim 5, wherein the user input comprises a prompt, wherein the prompt comprises configuring the user device to display the prompt and comprises an attestation from the user indicating the user is physically near the user device.

7. The system of claim 1, wherein the address further comprises a uniform resource locator (URL) address, and wherein the application is a web-based application.

8. A computer program product for software application access management, the computer program product comprising a non-transitory computer-readable medium comprising code causing an apparatus to:

receive a trigger;

determine a user main account login, wherein the user main account login comprises a user is logged into a main account on a user device;

access a peripheral device, wherein the peripheral device is used to determine a physical location of the user, and wherein the peripheral device is communicatively coupled to the user device;

determine a user presence, wherein the user presence comprises determining the user is physically near the user device by using data from the peripheral device;

retrieve an address from a database, wherein the address is associated with an application, and wherein the address is retrieved via querying the database; and execute a macro, wherein the macro is used to access the application via the address using a network protocol, wherein executing the macro further comprises:

retrieving the address from the database;

initiating a browser, wherein the browser comprises executable software stored on the user device;

establishing a connection to the application via the address using the browser and the network protocol; and configuring the user device to display the application.

9. The computer program product of claim 8, wherein the trigger further comprises at least one of:

a periodic trigger, an action trigger, a network trigger, or a user trigger.

10. The computer program product of claim 9, wherein the action trigger further comprises:

receiving an access window, wherein the access window defines a first time period within which the user is required to login to the application to maintain access to the application;

creating a login window, wherein the login window defines a second time period equal to or less than the access window; and determining that a last login is within the login window, wherein the last login comprises a most recent user login of the application.

11. The computer program product of claim 8, wherein the database further comprises user credentials, wherein the user credentials are used to access the application, and wherein executing the macro further comprises:

retrieving the address from the database;

initiating a browser, wherein the browser comprises executable software stored on the user device;

establishing a connection to the application via the address using the browser and the network protocol;

locating one or more fields associated with a form of the application used to input the user credentials;

inputting the user credentials into the one or more fields associated with the form; and submitting the form, wherein submitting the form authenticates the user credentials and logs the user into the application.

12. The computer program product of claim 8, wherein determining the user presence further comprises receiving a user input via the peripheral device, wherein the user input indicates the user is physically near the user device.

13. The computer program product of claim 12, wherein the user input comprises a prompt, wherein the prompt comprises configuring the user device to display the prompt and comprises an attestation from the user indicating the user is physically near the user device.

14. The computer program product of claim 8, wherein the address further comprises a uniform resource locator (URL) address, and wherein the application is a web-based application.

15. A method for software application access management, the method comprising:

receiving a trigger;

determining a user main account login, wherein the user main account login comprises a user is logged into a main account on a user device;

accessing a peripheral device, wherein the peripheral device is used to determine a physical location of the user, and wherein the peripheral device is communicatively coupled to the user device;

determining a user presence, wherein the user presence comprises determining the user is physically near the user device by using data from the peripheral device;

retrieving an address from a database, wherein the address is associated with an application, and wherein the address is retrieved via querying the database; and executing a macro, wherein the macro is used to access the application via the address using a network protocol, wherein executing the macro further comprises:

retrieving the address from the database;

initiating a browser, wherein the browser comprises executable software stored on the user device;

establishing a connection to the application via the address using the browser and the network protocol; and configuring the user device to display the application.

16. The method of claim 15, wherein the trigger further comprises at least one of:

a periodic trigger,
an action trigger,
a network trigger, or
a user trigger.

17. The method of claim 16, wherein the action trigger further comprises:

receiving an access window, wherein the access window defines a first time period within which the user is required to login to the application to maintain access to the application;

creating a login window, wherein the login window defines a second time period equal to or less than the access window; and determining that a last login is within the login window, wherein the last login comprises a most recent user login of the application.

* * * * *